(12) United States Patent

Clinton et al.

(10) Patent No.: US 12,654,395 B2

(45) Date of Patent: *Jun. 16, 2026

(54) STEREOLITHOGRAPHY APPARATUS FOR IMPROVING PLANARITY OF A TRANSPARENT SHEET

(71) Applicant: 3D Systems, Inc., Rock Hill, SC (US)

(72) Inventors: Nickolas M. Clinton, Carlsbad, CA (US); Charles W. Hull, Santa Clarita, CA (US); Grant Draper, Escondido, CA (US); David Sabo, San Diego, CA (US); Samuel David Rohrbach, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/818,073

(22) Filed: Aug. 28, 2024

(65) Prior Publication Data

US 2025/0001688 A1 Jan. 2, 2025

Related U.S. Application Data

(63) Continuation-in-part of application No. 18/753,118, filed on Jun. 25, 2024.

(60) Provisional application No. 63/620,328, filed on Jan. 12, 2024, provisional application No. 63/510,962, filed on Jun. 29, 2023.

(51) Int. Cl.
*B29C 64/245* (2017.01)
*B29C 64/218* (2017.01)
*B29C 64/232* (2017.01)

*B29C 64/236* (2017.01)
*B29C 64/393* (2017.01)
*B33Y 30/00* (2015.01)
(Continued)

(52) U.S. Cl.
CPC .......... *B29C 64/245* (2017.08); *B29C 64/218* (2017.08); *B29C 64/232* (2017.08); *B29C 64/236* (2017.08); *B29C 64/393* (2017.08); *B33Y 30/00* (2014.12); *B29C 64/124* (2017.08); *B29K 2909/08* (2013.01); *B33Y 10/00* (2014.12)

(58) Field of Classification Search
CPC .... B29C 64/124; B29C 64/129; B29C 64/135
See application file for complete search history.

(56) References Cited

U.S. PATENT DOCUMENTS

| | | |
|---|---|---|
| 5,171,490 A | 12/1992 | Fudim |
| 5,306,446 A | 4/1994 | Howe |

(Continued)

*Primary Examiner* — Atul P. Khare

(57) ABSTRACT

A 3D printing system includes a machine chassis, a build vessel, a carriage, an actuator, a build platform, and a light engine. The build vessel is supported by the machine chassis and contains a photocurable liquid. The build vessel includes a downward extending tension ring that tensions a transparent sheet and defines a datum plane. The carriage supports a glass plate and a roller. The carriage is configured to press the roller against the two opposing sides of the tension ring. The actuator is configured to vertically position an upper surface of the glass plate in two positions including (U) an upper position at which the upper surface of the glass plate is coplanar with the datum plane and (L) a lower position in which the upper surface of the glass is spaced away from the datum plane.

20 Claims, 14 Drawing Sheets

(51) Int. Cl.
　　*B29C 64/124*　　　　(2017.01)
　　*B33Y 10/00*　　　　(2015.01)

(56) References Cited

U.S. PATENT DOCUMENTS

| | | | |
|---|---|---|---|
| 7,195,472 B2 | 3/2007 | Hendrik | |
| 7,438,846 B2 | 10/2008 | Hendrik | |
| 7,845,930 B2 | 12/2010 | Shkolnik et al. | |
| 8,777,602 B2 | 7/2014 | Vermeer et al. | |
| 9,375,881 B2 * | 6/2016 | Elsey | B29C 35/0888 |
| 9,981,425 B2 * | 5/2018 | El-Siblani | B29C 64/264 |
| 10,675,856 B2 * | 6/2020 | FrantzDale | B33Y 30/00 |
| 11,059,219 B2 | 7/2021 | Childers | |
| 11,141,911 B2 | 10/2021 | Turner et al. | |
| 11,167,491 B2 | 11/2021 | Frantzdale et al. | |
| 11,179,882 B2 * | 11/2021 | Stadlmann | B29C 64/20 |
| 11,305,483 B2 | 4/2022 | Goldman | |
| 11,318,672 B2 | 5/2022 | Elsey | |
| 11,318,673 B2 | 5/2022 | Oikonomopoulos et al. | |
| 11,390,027 B2 | 7/2022 | Lobovsky et al. | |
| 11,396,133 B2 | 7/2022 | Dmitri et al. | |
| 11,491,712 B2 | 11/2022 | Turner et al. | |
| 11,820,074 B2 | 11/2023 | Goldman | |
| 12,233,600 B2 * | 2/2025 | Megretski | B33Y 40/00 |
| 2005/0248061 A1 | 11/2005 | Shkolnik et al. | |
| 2010/0227068 A1 * | 9/2010 | Boot | B29C 64/135 |
| | | | 118/56 |
| 2019/0369566 A1 | 12/2019 | Lobovsky et al. | |
| 2021/0299952 A1 | 9/2021 | Xia et al. | |

* cited by examiner

STEREOLITHOGRAPHY APPARATUS FOR IMPROVING PLANARITY OF A TRANSPARENT SHEET

CROSS REFERENCE TO RELATED APPLICATIONS

This Non-Provisional patent application claims priority to and is a continuation-in-part of US Utility—Nonprovisional application Ser. No. 18/753,118 Entitled "Stereolithography Apparatus for Improving Planarity of a Transparent Sheet" by Nickolas M. Clinton et al., filed on Jun. 25, 2024. The Nonprovisional application Ser. No. 18/753,118 claims priority to U.S. Provisional Application Ser. No. 63/510,962, Entitled "Stereolithography Apparatus for Improving Planarity of a Transparent Sheet" by Charles W. Hull et al., filed on Jun. 29, 2023, incorporated herein by reference under the benefit of U.S.C. 119(e). The Nonprovisional application Ser. No. 18/753,118 also claims priority to U.S. Provisional Application Ser. No. 63/620,328, Entitled "Stereolithography Apparatus for Improving Planarity of a Transparent Sheet" by Nickolas M. Clinton et al., filed on Jan. 12, 2024, incorporated herein by reference under the benefit of U.S.C. 119(e).

FIELD OF THE INVENTION

The present disclosure concerns an apparatus and method for manufacture of solid three dimensional (3D) articles from radiation curable materials in a layer-by-layer manner. More particularly, the present disclosure concerns an improved mechanism for obtaining high resolution 3D articles by controlling flatness of a transparent sheet which forms part of an optical path.

BACKGROUND

Three dimensional (3D) printers are in rapidly increasing use for manufacturing customized 3D articles. One class of 3D printers includes stereolithography printers having a general principle of operation including the selective curing and hardening of radiation curable (i.e., photocurable) liquids. One type of stereolithography system includes a containment vessel holding the photocurable liquid, a movement mechanism coupled to a support tray, and a light engine. The stereolithography system manufactures or fabricates a 3D article by selectively curing layers of the photocurable liquid along a build plane above a transparent sheet. There is a desire to produce articles having features sizes that are 10 microns or smaller in size. One challenge is the weight of a column of photocurable liquid distorting the transparent sheet which in turn impacts dimensional accuracy of a 3D article. Another challenge is an ability to create a thin layer of photocurable liquid to enable the small feature sizes.

SUMMARY

In an aspect of the disclosure a three-dimensional (3D) printing system is configured to manufacture or fabricate a 3D article. The 3D printing system includes a machine chassis, a build vessel, a carriage, an actuator, a build platform, and a light engine. The machine chassis includes a vessel support.

The build vessel contains a photocurable liquid and is supported by the vessel support. The build vessel includes a vessel base and a transparent sheet. The vessel base includes a downward extending tension ring. The transparent sheet is tensioned over the tension ring and laterally bounds a build plane. The build plane is defined along orthogonal lateral axes including an X-axis and a Y-axis. A lower surface of the transparent sheet supported by the tension ring defines a datum plane.

The carriage supports a glass plate and a roller. The roller laterally extends below two opposing sides of the tension ring. The carriage is configured to press the roller against the two opposing sides of the tension ring so that an upper crest of the roller is pressed against the datum plane.

The actuator is coupled to the glass plate and configured to vertically position an upper surface of the glass plate in two positions including (U) an upper position at which the upper surface of the glass plate is coplanar with the datum plane and (L) a lower position in which the upper surface of the glass is spaced away from the datum plane. The build platform is supported over a build area of the build plane. The build platform includes a build plate having a lower surface for supporting the 3D article over at least a rectangular portion of the build area.

The 3D printing system includes a controller programmed to operate portions of the 3D printing system. The controller performs various steps that can include: (1) position a lower face of the 3D article to be coplanar with the build plane, (2) translate the glass plate along the X-axis to overlap a rectangular area under the build area, (3) operate the actuator to vertically position the upper surface of the glass plate to the (U) upper position, (4) position and operate the light engine to selectively irradiate the rectangular area and to selectively harden a layer of the photocurable fluid onto the lower face of the 3D article over the positional area of the build plane, and (5) operate the actuator to lower the upper surface of the glass plate to the (L) lower position.

The steps (1)-(5) can be sequential according to number or can occur in a different order. Also, some steps can be repeated. For example, step (4) may be repeated before performing step (5).

In one implementation, step (2) includes the roller traversing the build area to provide a correct fluid thickness of photocurable fluid over the transparent sheet. In this implementation, step (4) can be repeated in order to irradiate a sequence of rectangles arranged along the X-axis to complete selective irradiation of the build plane. For one repetition of step (4), the light engine can be scanned or stepped along the Y-axis to enable the selective irradiation of the rectangular area.

The machine chassis can define a recessed volume that is laterally adjacent to the build area. During step (2), the controller can transport the glass plate from the recessed volume to overlap with the positional area.

The glass plate can have a lateral dimension along the X-axis at least equal to a lateral dimension along the X-axis of the build plane. The glass plate can also have a lateral dimension along the Y-axis at least equal to a lateral dimension along the Y-axis of the build plane.

The glass plate can have a lateral dimension along the Y-axis that is less than the lateral dimension along the X-axis of the build area. The glass plate can include a plurality of glass plates arranged along the X-axis.

The 3D printing system can include a gas pressure source. The gas pressure source is configured to apply a gas pressure to a lower surface of the transparent sheet to at least partially or completely offset a pressure exerted on an upper surface of the transparent plate by a fluid column of the photocurable fluid.

DETAILED DESCRIPTION OF THE PREFERRED EMBODIMENT

Figure 1:
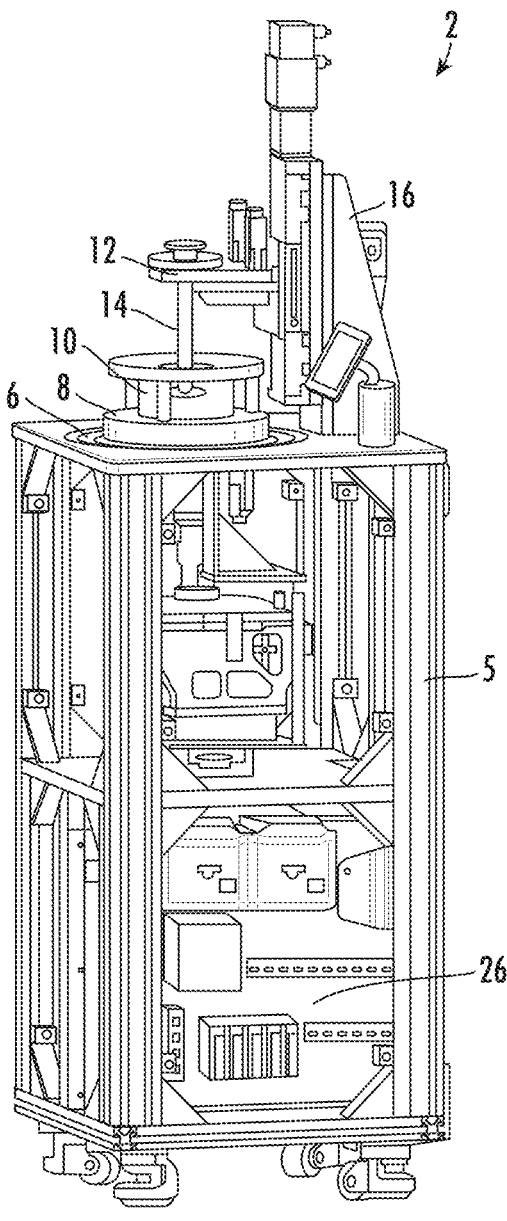
FIG. 1 is an isometric drawing depicting an embodiment of a three-dimensional (3D) printing system for manufacturing a 3D article.

FIG. 1 is an isometric drawing of an embodiment of a three-dimensional (3D) printing system 2 for manufacturing or fabricating a 3D article 4 (FIG. 2) with an outer housing removed to illustrate internal components. In describing 3D system 2, mutually perpendicular axes X, Y, and Z will be used. Axes X and Y are generally horizontal lateral axes. Axis Z is a vertical axis that is generally aligned with a gravitational reference. In using the word "generally" it is implied that a limitation that is "generally" true is by design and to within manufacturing tolerances. Additionally angular axes theta-X, theta-Y, and theta-Z are rotations about the X, Y, and Z axes respectively.

3D printing system 2 includes a chassis or frame 5 having or including a vessel support 6. A build vessel 8 configured to contain a photocurable liquid 10 is supported by the vessel support 6. A build platform 14 is supported by an elevator 12. A vertical movement mechanism 16 is configured to vertically position the elevator 12.

An embodiment of vertical movement mechanism 16 includes a motorized ball bearing screw mechanism or otherwise referred to as a ball screw mechanism. A ball screw mechanism includes a vertical screw shaft that passes through a ball nut. The ball nut contains recirculating steel balls and translates vertically in response to rotation of the vertical screw shaft. The vertical screw shaft has helical channels that engage the recirculating balls. The elevator 12 includes the ball nut. A motor is coupled to the vertical screw shaft and is configured to selectively rotate the vertical screw shaft. As the vertical screw shaft rotates, the action of the vertical screw shaft upon the ball nut translates the elevator upward and downward depending on a direction of rotation. Such translation mechanisms are known in the art for precision positioning along vertical, horizontal, and oblique axes. Alternative embodiments of vertical movement mechanisms can include a lead screw and nut mechanism or a rack and pinion mechanism or a motorized belt/pulley system. All such movement mechanisms known in the art for linearly translating components along various axes. Examples include motorized stages for such diverse machines such as 2D printers, 3D printers, microscopes, milling machines, and metrology devices. All references to movement mechanisms on various axes described herein can utilize one or more of these known methods.

Figure 2:
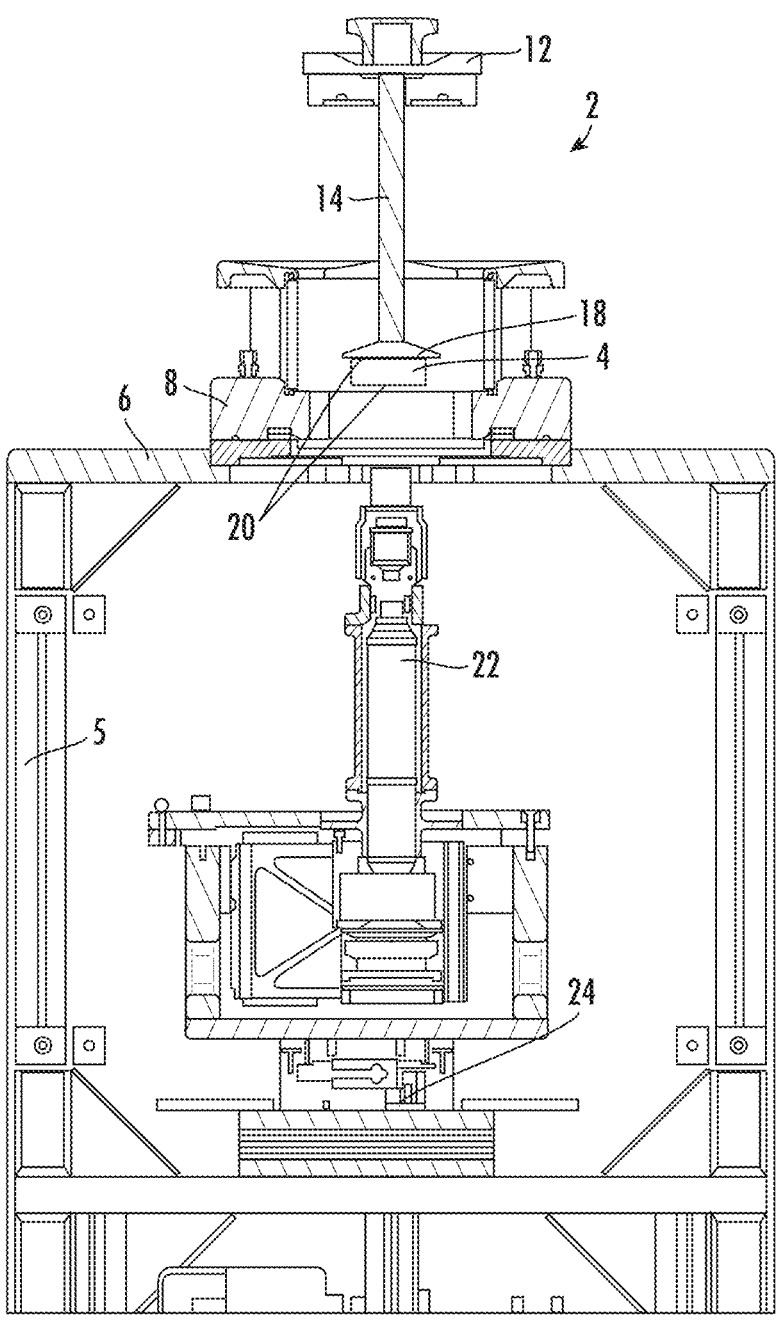
FIG. 2 is a side cutaway view of an embodiment of a three-dimensional (3D) printing system.

FIG. 2 is a side cutaway view of 3D printing system 2. Build platform 14 includes a build plate 18 having a lower surface or face 20 for supporting the 3D article 4 being fabricated. Hereafter element number 20 will refer to a lower face 20 of the build plate 18 or of a partially fabricated 3D article 4. A projection light engine or projector 22 is supported on a lateral movement mechanism 24.

Lateral movement mechanism 24 is configured to translate and position projector 22 along lateral axes X and Y. Lateral movement mechanism 24 can also be referred to as an "XY stage" for some embodiments. In an illustrative embodiment, the lateral movement mechanism 24 includes a vertically stacked arrangement of two linear or stepper motors operating at right angles to each other including an "X motor" and a "Y motor". The motors can act directly or indirectly on the stage to actuate translation of the stage along the X and Y axes. In one embodiment, the motors individually drive a lead screw threaded through a nut. The nut translates linearly in response to motor rotation. This action is similar to that described with respect to the vertical movement mechanism 16. Alternatively, the motors can drive a gear mechanism known as a "gear train". The gear train is a gear reduction mechanism to enable precision movement. Stacks of motorized X and Y stages are known in the art for precision movement along various axes for printers, 3D printers, robotics, inspection systems, and other devices requiring precision movement.

While FIG. 2 illustrates a single projector 22, the light engine 22 can include a plurality of projectors 22. In one embodiment, the light engine 22 includes a row of three projectors 22 arranged along the X or Y axis. In an illustrative embodiment, the plurality of projectors 22 are in a fixed lateral position with respect to each other such that the lateral movement mechanism 24 moves the plurality of projectors 22 in tandem.

Referring back to FIG. 1, the 3D printing system 2 includes a controller 26. Controller 26 is configured to operate the vertical movement mechanism 16, the projector 22, the lateral movement mechanism 24, and other portions of system 2. Also, controller 26 is configured to receive information from sensors and feedback devices within chassis 5. In the illustrated embodiment, controller 26 is within chassis 5. However, it is to be understood that controller 26 can also include computer devices external or remote to the chassis 26. Thus controller 26 can include one or more of a microcontroller, a desktop computer, a laptop computer, a mainframe computer, and a server or shared computing devices.

Figures 3, 4:
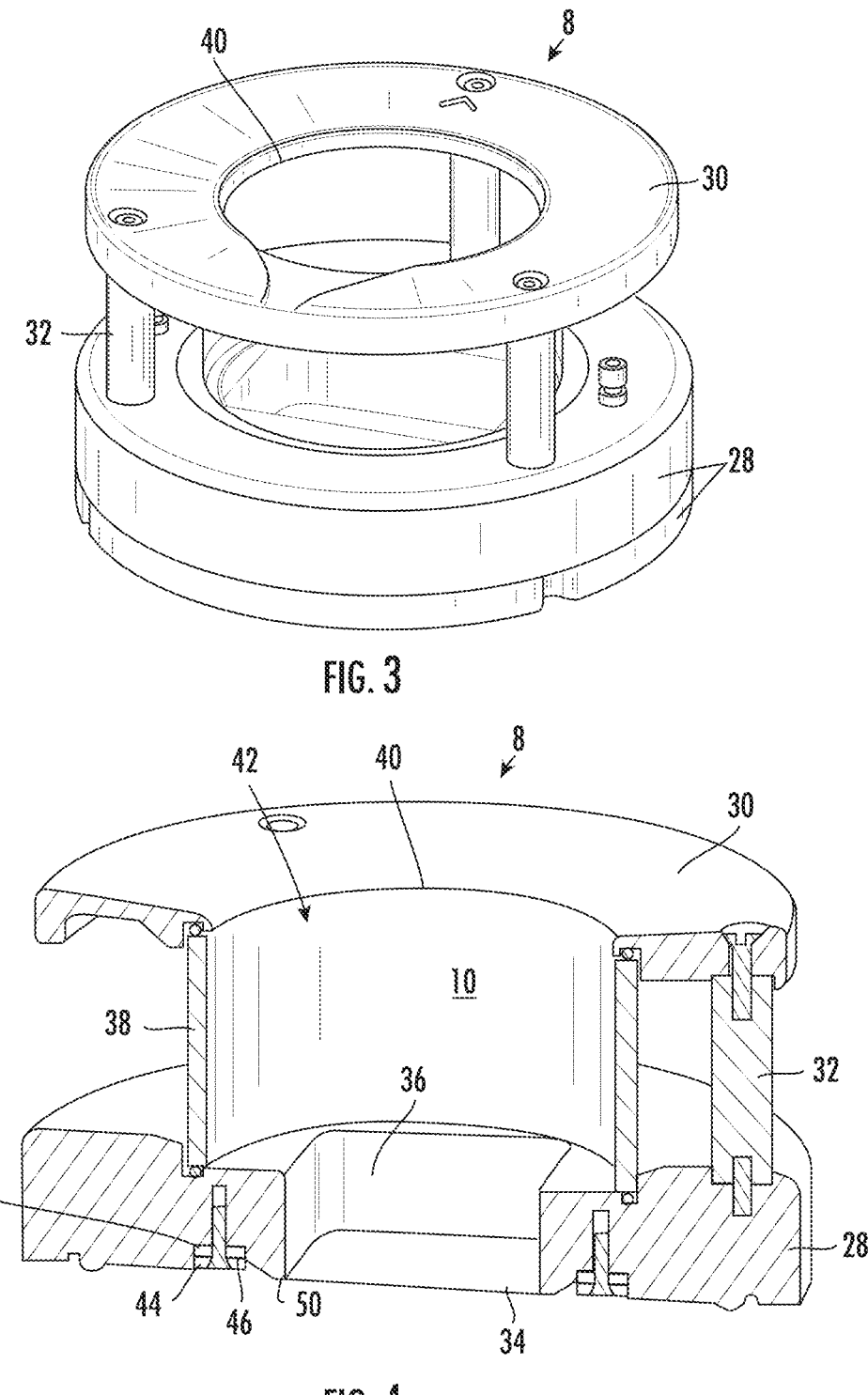
FIG. 3 is an isometric drawing of a build vessel in isolation.
FIG. 4 is a cutaway isometric view of a build vessel in isolation.

FIG. 3 is an isometric view of the build vessel 8 in isolation. Build vessel 8 includes a vessel base 28 coupled to a top 30 by dowels 32. When build vessel 8 is installed in 3D printing system 2, the vessel base 28 aligns to the vessel support 6.

FIG. 4 is a cutaway isometric view of an upper portion of build vessel 8. A transparent sheet 34 closes an opening 36 in the vessel base 28. A wall 38 extends vertically between the vessel base 28 and an opening 40 in the top 30 of the build vessel 8. The vessel base 28, transparent sheet 34, and wall 38 provide a vessel 42 for containing the photocurable liquid 10.

In an illustrative embodiment, the transparent sheet 34 is a polymer sheet that is transparent to radiation in the blue to ultraviolet (UV) range or about 100 to 500 nanometers (nm). The polymer can be an amorphous polymer known in the art to provide optical clarity, low refractive index, and other properties desirable for this application. The polymer is also diffusively transmissive to oxygen which provides an inhibitor to prevent buildup of hardened photocurable material on the transparent sheet 34. Other polymers can also be used if they have a similar set of properties.

The photocurable liquid 10 can a photocurable "bio-ink" or a photocurable resin. The photocurable liquid 10 generally contains, inter alia, a monomer and a catalyst. In response to blue to UV radiation, the catalyst causes the monomer to polymerize or cross-link and solidify. Various photocurable bio-inks and resins are known in the art of stereolithography.

In the illustrated embodiment, the projector 22 is a projection-based light engine. The projector 22 includes a light source, a spatial light modulator, and projection optics. The light source illuminates the spatial light modulator with electromagnetic radiation having a wavelength in a blue to ultraviolet range. The spatial light modulator includes an array of micromirrors that individually have two states—an ON state at which a small beam of light is transmitted to the projection optics—an OFF state in which the light reaching the micromirror is diverted into a light trap and does not reach the projection optics. The projection optics project and focus small beams of light received onto a build plane 56 (FIG. 5) that is above the transparent sheet 34. The build plane 56 is a thin (less than 0.1 millimeter (mm) thick) planar or parallelepiped region along which a new layer of hardened photocurable liquid 10 is accreted on to a lower face 20 of the build plate 18 or the 3D article 4 during fabrication of the 3D article 4. A lateral extent of the build plane 56 is defined by the lateral extent of radiation that can be applied by the light engine 22 during formation of a layer of the 3D article 4. The lateral extent of radiation is in turn defined by characteristics of the light engine 22 and lateral limits of the lateral movement mechanism 24 along the X and Y axes.

A frame 44 clamps a peripheral edge 46 of the transparent sheet 34. The frame 44 is mounted in a recess 48 formed into the vessel base 28. The vessel base 28 includes a tension ring or ridge 50 that stretches the transparent sheet 34.

Figure 5:
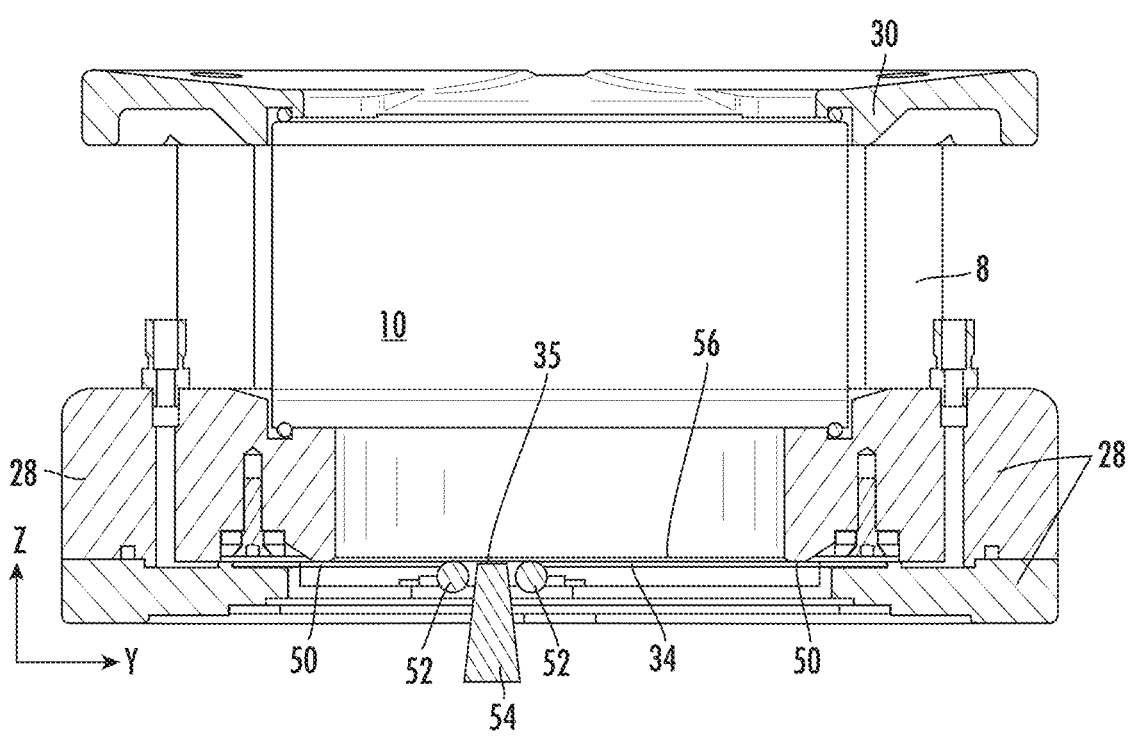
FIG. 5 is a sectional view of a first embodiment of a build vessel and certain portions of a vessel support.

FIG. 5 is a side sectional view of a first embodiment of the build vessel 8. The transparent sheet 34 is tensioned over the tension ring 50. Without further support, the transparent sheet 34 would tend to bulge downward, which would result in tolerance errors in forming layers of the 3D article 4. To reduce this error a pair of rollers 52 provide a localized vertical support for a supported portion 35 of the transparent sheet 34. In the first embodiment, the supported portion 35 is laterally between the pair of rollers 52. Shown in this sectional view is an optical path 54 from the projector 22 which is indicative of a radiation path from the projector 22 to a build plane 56 which is just above the transparent sheet 34. The projector 22 and the optical path 54 are configured to be positioned together along the lateral X axis during a selective application of radiation to a stripe or column of the build plane 56. Because of a limited distance between the two rollers 52, the bulge induced error is significantly reduced.

Figure 6:
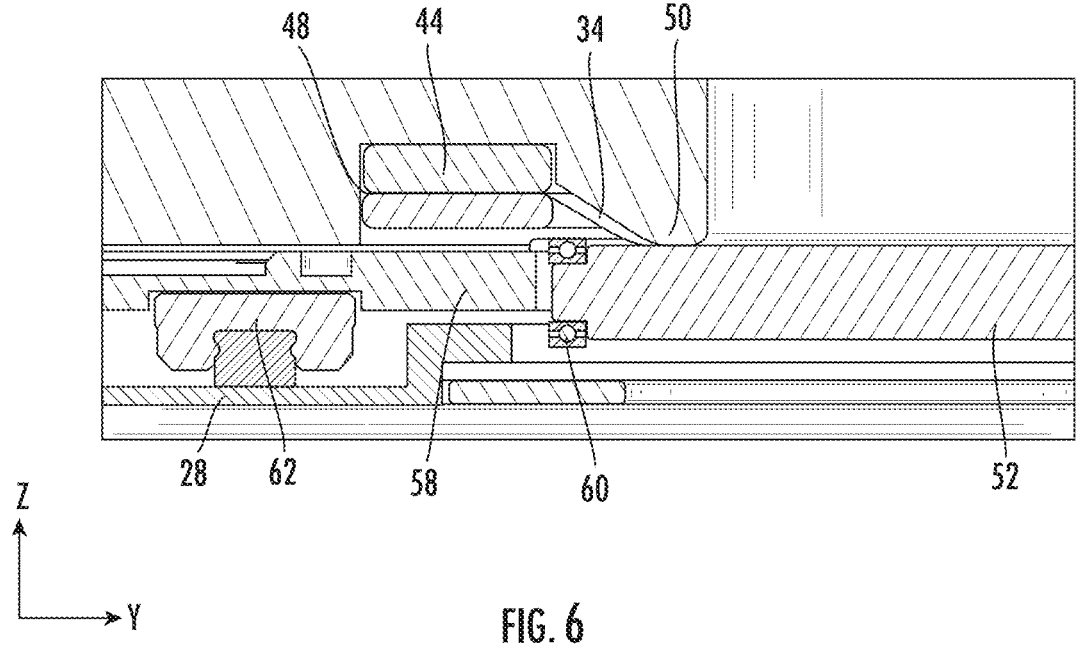
FIG. 6 is a side sectional view of a portion of the build vessel of FIG. 5, a vessel support, and a roller.

FIG. 6 is a side sectional view of a portion of the build vessel 8 including roller 52. Roller 52 has an axis of rotation along lateral axis Y. The roller 52 is mounted to the carriage 58 by a roller bearing 60. Roller bearing 60 includes a circular race of ball bearings to allow low friction rotation of the roller 52 about an axis of rotation parallel to the Y-axis. The carriage 58 is mounted to the vessel base 28 via a linear bearing 62. The carriage 58 can therefore translate along the lateral axis X and along the linear bearing 62 relative to the vessel base 28.

Figure 7:
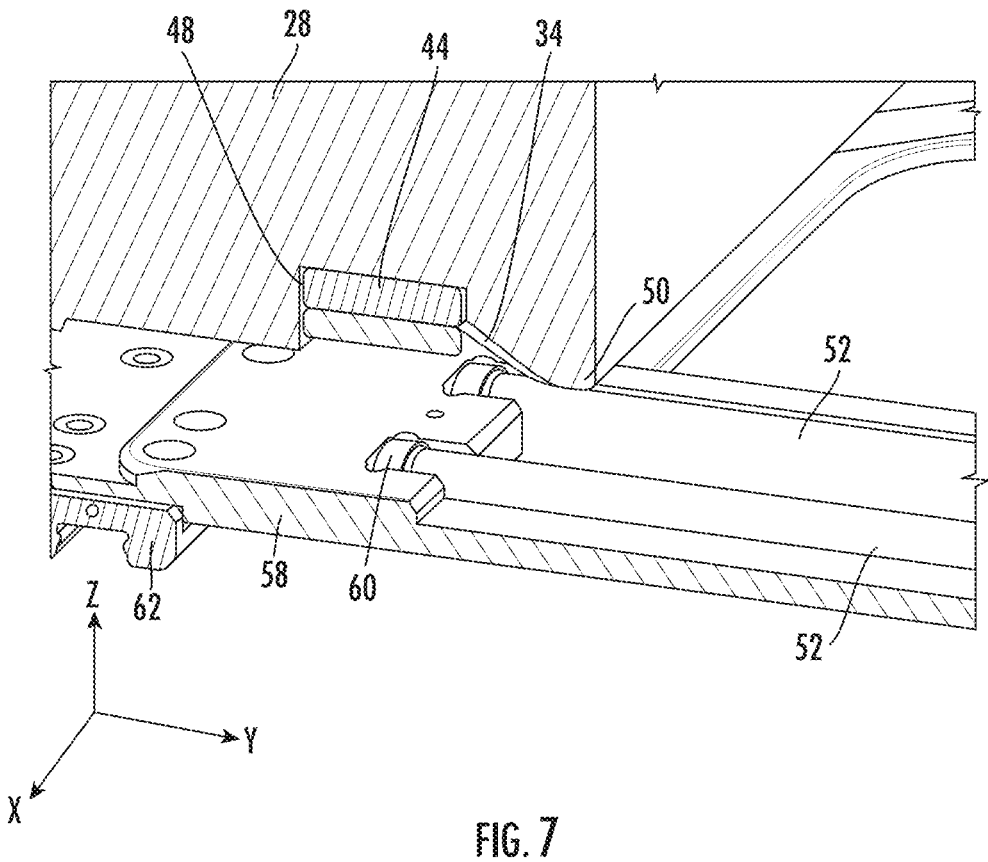
FIG. 7 is an isometric cutaway view of a portion of a build vessel and a carriage having two rollers.

The roller 52 is biased upward and presses upon the transparent sheet 34 and the tension ring 50. The transparent sheet 34 is "sandwiched" between the roller 52 and the tension ring 50. Thus, the bias of the roller 52 against the tension ring 50 controls a Z-height of the roller 52 to provide a very accurate vertical positioning of the transparent sheet 34 between the two rollers 52. The details illustrated in FIG. 7 are true for both ends of the roller 52. Thus, roller 52 extends between two opposing sides of the tension ring 50 and laterally spans build plane 56 along the lateral axis Y.

FIG. 7 is an isometric cutaway view of a portion of the build vessel 8, two rollers 52, and carriage 58. The carriage 58 is mounted to the vessel base 28 by two linear bearings 62 at opposed ends of vessel base 28 with respect to lateral axis Y. The carriage 58 and the projector 22 are configured to be positioned together along lateral axis X by the X-motor of the lateral movement mechanism 24. (In a later embodiment discussed infra, the carriage 58 is translated and positioned by a separate X-motor 25). The rollers 52 are spring-biased or pressed against the transparent sheet 34 and tension ring 50 to maintain a consistent Z-height of transparent sheet 34 over the column or stripe that the projector 22 is selectively irradiating. The rollers 52 rotate about the roller bearings 60 as they translate with the carriage along X. The Y motor of the lateral movement mechanism 24 is configured to translate the projector 22 along the Y axis relative to the carriage 58.

Figure 8:
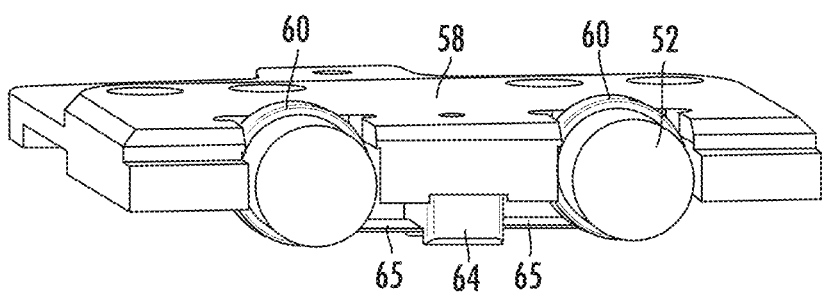
FIG. 8 is an isometric cutaway view of a carriage and two rollers.

FIG. 8 is an isometric cutaway view of the carriage 58, rollers 52 (cut off near carriage 58) and a spring bias mechanism 64 including leaf springs 65. Spring bias mechanism 64 is configured to apply an upward +Z spring force to the rollers 52 which in turn biases the rollers 52 against transparent sheet 34 and tension ring 50.

In an illustrative embodiment, the rollers 52 have a surface having a lower hardness or scratch resistance than a lower surface of the transparent sheet 34. This will help prevent the rollers 52 from scratching the transparent sheet. In one embodiment, the rollers 52 are coated with a low hardness plastic or rubber material. In another embodiment, the rollers 52 can be coated with a thin machine oil that is transparent to blue to ultraviolet radiation. In yet other embodiments, the rollers 52 can be coated with an acrylic, a polyurethane, or silicone polymer. In a further embodiment, rollers 52 are coated with a felt material.

Figure 9:
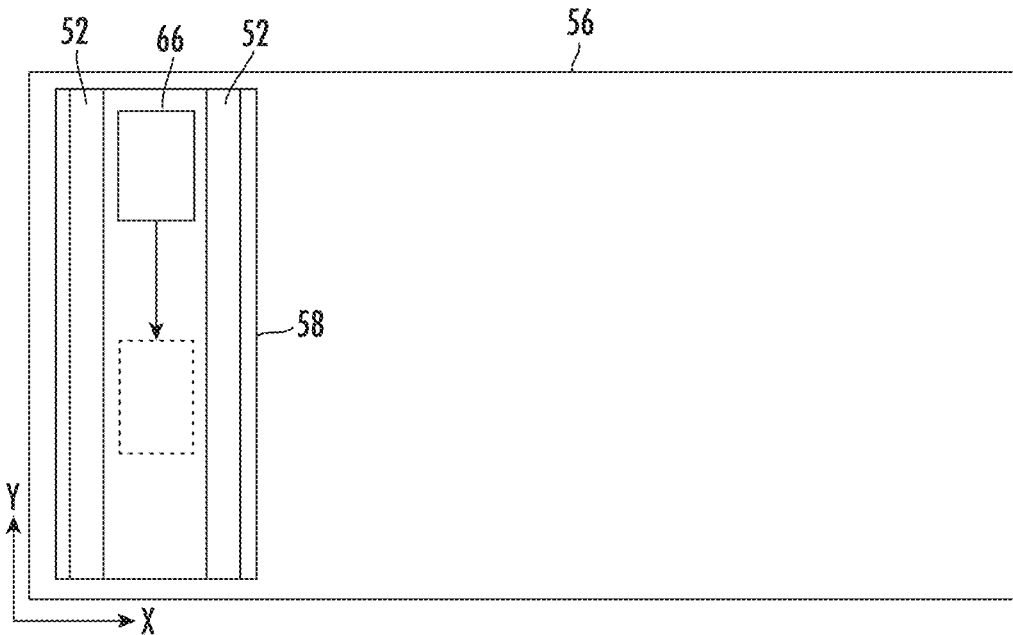
FIG. 9 is a schematic illustration of a build plane with a carriage in a first position.
Figure 10:
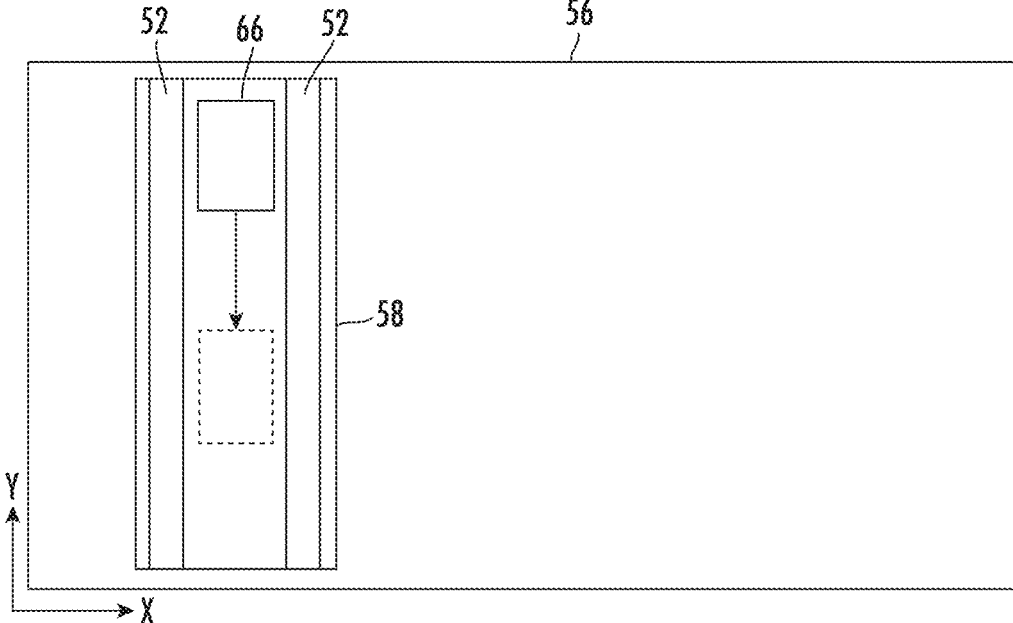
FIG. 10 is a schematic illustration of a build plane with a carriage in a second position.

FIGS. 9 and 10 are schematic illustrations that illustrate how the build plane 56 is selectively irradiated by the projector 22. In FIG. 9, the carriage 58 is positioned at a first location with respect to X. Projector 22 generates a pixelated rectangular pattern of radiation 66 upon the build plane 56. This has the effect of selectively curing the photocurable liquid 10 over that pixelated pattern 66. As the radiation is selectively applied, the Y-motor of lateral movement mechanism 24 scans the projector 22 and hence the pattern 66 along Y between rollers 52. Once the scanning is complete, the carriage 58 can be moved or stepped along the X-axis to a second location as illustrated in FIG. 10. Then scanning along the Y-axis and irradiation can proceed again. This step/scan method of selectively applying radiation is repeated until photocurable liquid 10 at build plane 56 has been selectively hardened as desired for a given layer of the 3D article 4. In another embodiment, the light engine is "stepped" along the Y-axis between irradiation. This other embodiment is referred to as a "step and repeat" method of irradiation. Thus, FIGS. 9 and 10 depict either a continuous scan and irradiation or step and repeat mode of operation.

Figure 11:
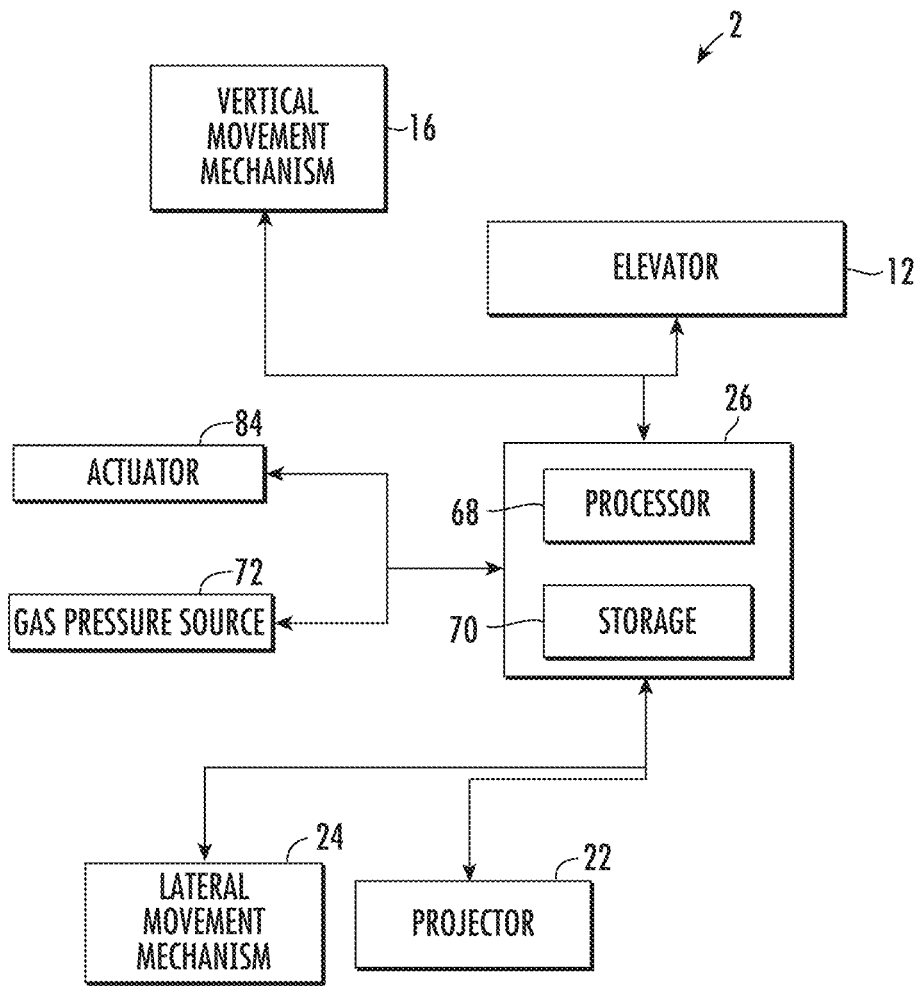
FIG. 11 is a simplified electrical block diagram of a 3D printing system.

FIG. 11 is a simplified electrical block diagram of a first embodiment of 3D printing system 2. The controller 26 includes a processor 68 coupled to an information storage 70. The information storage 70 includes one or more non-transient or non-volatile storage devices that store software instructions. When executed by the processor 68, the software instructions control portions of the 3D printing system 2 including the elevator 12, vertical movement mechanism 16, the projector 22, and the lateral movement mechanism 24. The controller 26 also operates a gas pressure source 72 and an actuator 84 to be discussed infra.

Figure 12:
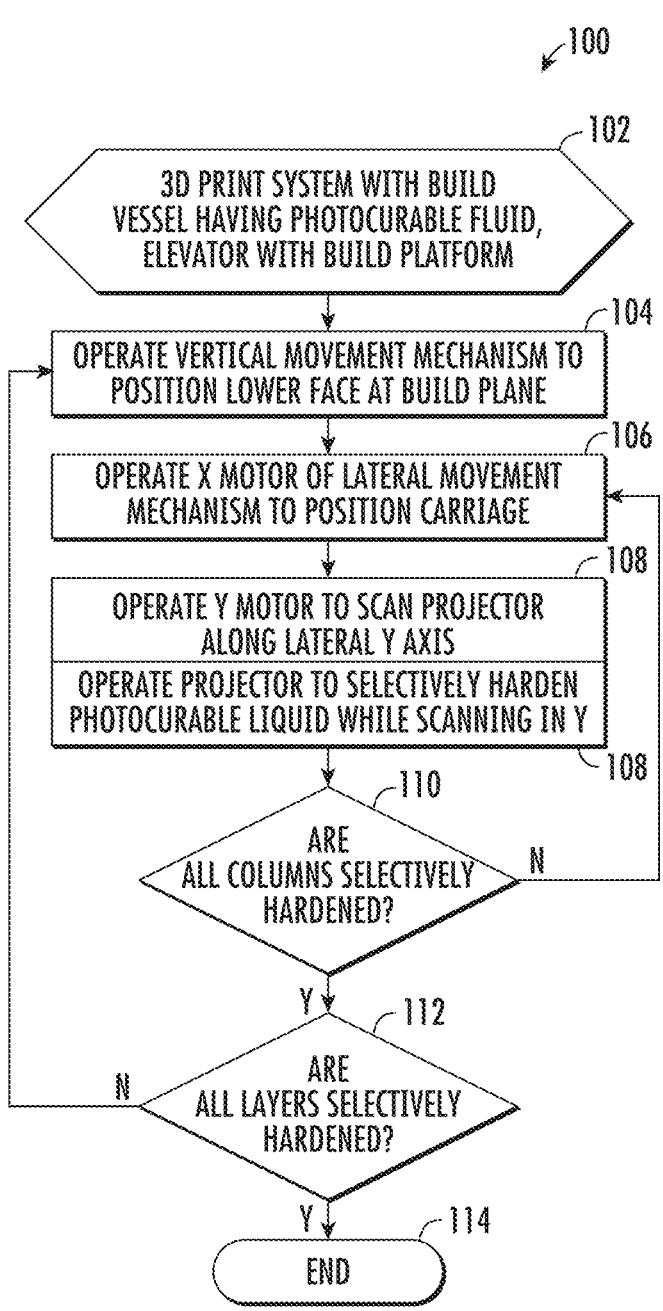
FIG. 12 is a flowchart depicting a method of manufacturing a 3D article.

FIG. 12 is a flowchart depicting a method 100 of manufacturing the 3D article 4. According to 102, the 3D printing system is ready for operating with a photocurable liquid 10 placed in the build vessel 8. According to 104, the vertical movement mechanism 16 is operated to position the lower face or surface 20 of build plate 18 (and later partially formed 3D article 4) at the build plane 56.

According to 106 the X motor of the lateral movement mechanism 24 is operated to position the carriage 58. According to 108, the Y motor of the lateral movement mechanism 24 is operated to scan (or step) the projector 22 (and hence the pixelated pattern 66) over between the rollers 52. Also according to 108, concurrent with the scanning, the projector 22 is operated to selectively irradiate of stripe or column of the build plane 56.

According to 110, a determination is made as to whether all columns of the build plane 56 have been selectively cured at a particular layer. If the answer is NO, then the process loops back to 106 to move to the next column. If the answer is YES, then the process moves to 112 to determine whether all layers of the 3D article have been selectively imaged. If the answer is NO, then the process loops back to 104 to move the lower face 20 to the build plane. If the answer is YES, then the method terminates according to 114.

Discussed supra, FIGS. 5-8 depict a first embodiment of the build vessel 8 in which a rectangular supported portion 35 of the transparent sheet 34 is vertically supported between a pair of rollers 58. FIGS. 13-16 are various views depicting a second embodiment of build vessel 8 which differs from the first embodiment in that the rectangular supported portion 35 is adjacent to a single roller 52. Whether the first embodiment (pair of rollers 52) or second embodiment (single roller 52) is used may depend on various factors including thickness, modulus, tension and other physical parameters of the transparent sheet 34. All other elements, features, and limitations of FIGS. 1-12 can otherwise apply in part or in whole to the second embodiment disclosed in FIGS. 13-15.

Figure 13:
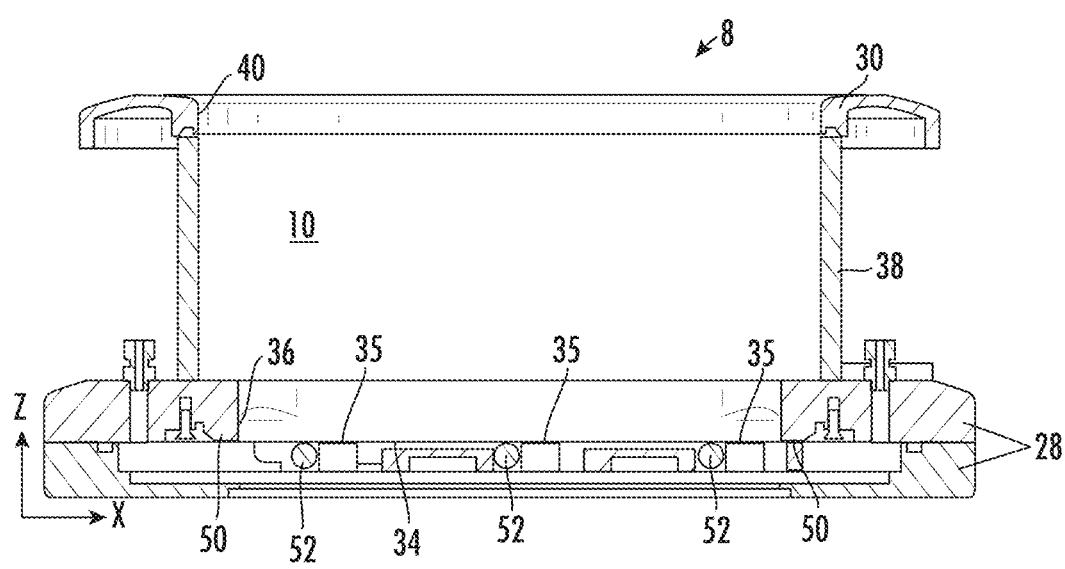
FIG. 13 is a sectional view of a second embodiment of a build vessel and certain portions of a vessel support.

FIG. 13 is a side sectional view of a second embodiment of the build vessel 8. In the illustrated second embodiment, there are three single rollers 52 that correspond to three different light projectors 22 that can scan along the X-axis. However, the second embodiment can also function with a single roller 52 and a single light projector 22.

Figure 14:
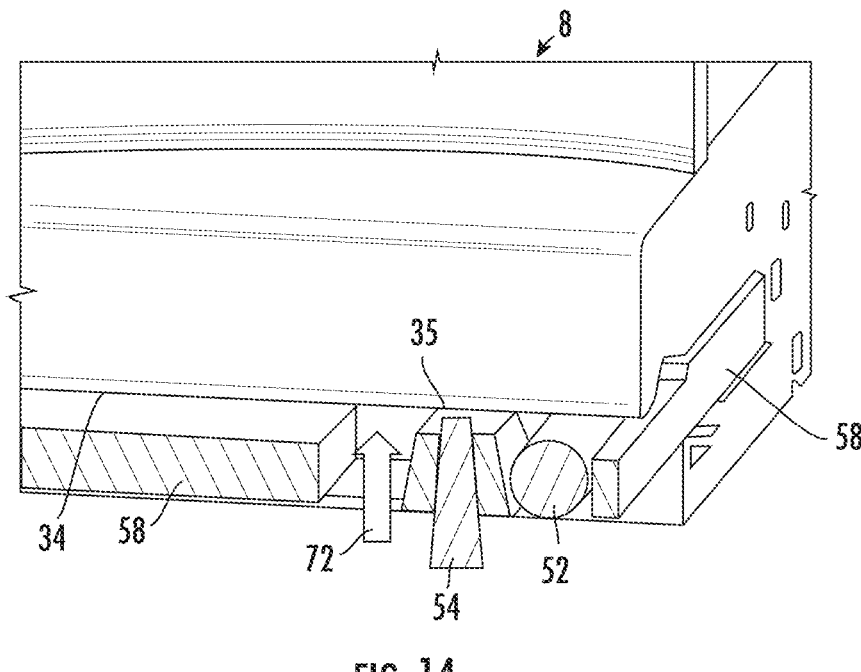
FIG. 14 is an isometric cutaway view of a portion of the build vessel of FIG. 13, a vessel support, and a roller.

FIG. 14 is an isometric cutaway view of a portion of the build vessel 8. As shown, the carriage 58 supports a single roller 52 that is adjacent to the rectangular supported portion 35 of the transparent sheet 34. The axis of roller 52 is along the axis Y which is parallel to a long axis of the supported portion 35. Given a stiffness of the transparent sheet 34, the single roller 52 can maintain sufficient horizontal planarity of the supported portion 35.

To further maintain the planarity and prevent the transparent sheet from separating from the printed part, the cavity inside of the vessel base 28 can be pressurized with gas. Element 72 depicts a direction of a force exerted by the gas upon a lower surface of the transparent sheet 34. Element 72 also depicts the gas pressure source 72. The pressurized gas at least partially counters the weight of the fluid above (photocurable liquid 10) and prevents sag of the transparent sheet 34 after the roller 52 has passed. The correct pressure will depend on the height of the fluid, the stiffness of the part being printed and other factors.

Figure 15:
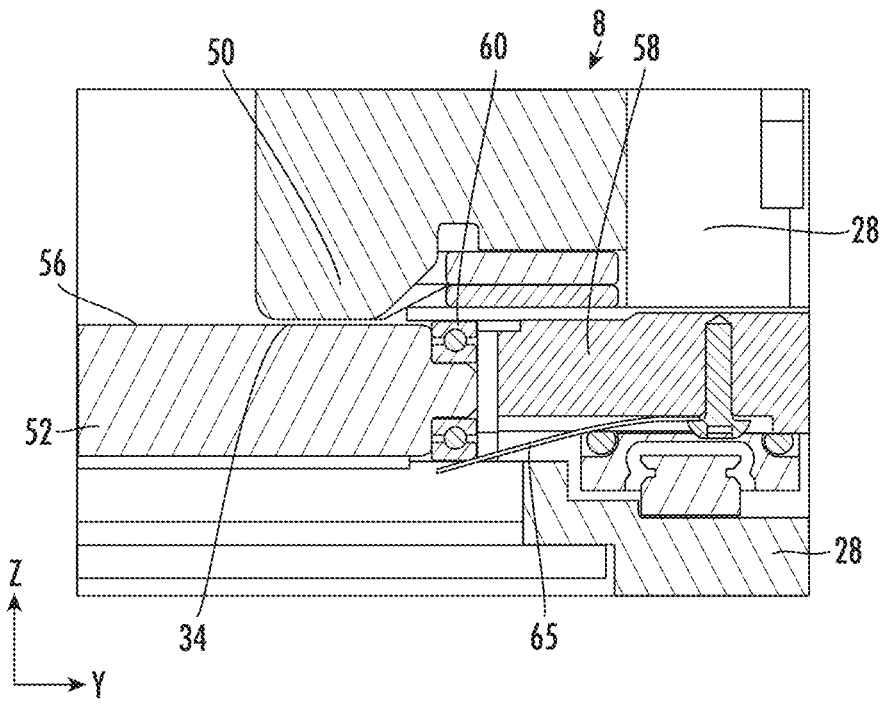
FIG. 15 is a side cross-sectional view of a portion of the build vessel of FIG. 13, a vessel support, and a roller.

FIG. 15 is a side sectional view of a portion of the build vessel 8. FIG. 15 is similar to FIG. 6. The primary implementation difference is in FIG. 15 carriage 58 supports a single roller 52 (as opposed to a pair of rollers 52). Otherwise, the description of FIG. 6 applies to FIG. 15. The roller 52 is biased or urged upward (+Z) by the leaf spring 65 and presses upon the tension ring 50. The transparent sheet 34 is "sandwiched" between the roller 52 and the tension ring 50. Roller 52 extends between two opposing sides of the tension ring 50 and therefore laterally spans the build plane 56 along the lateral axis Y.

Figure 16:
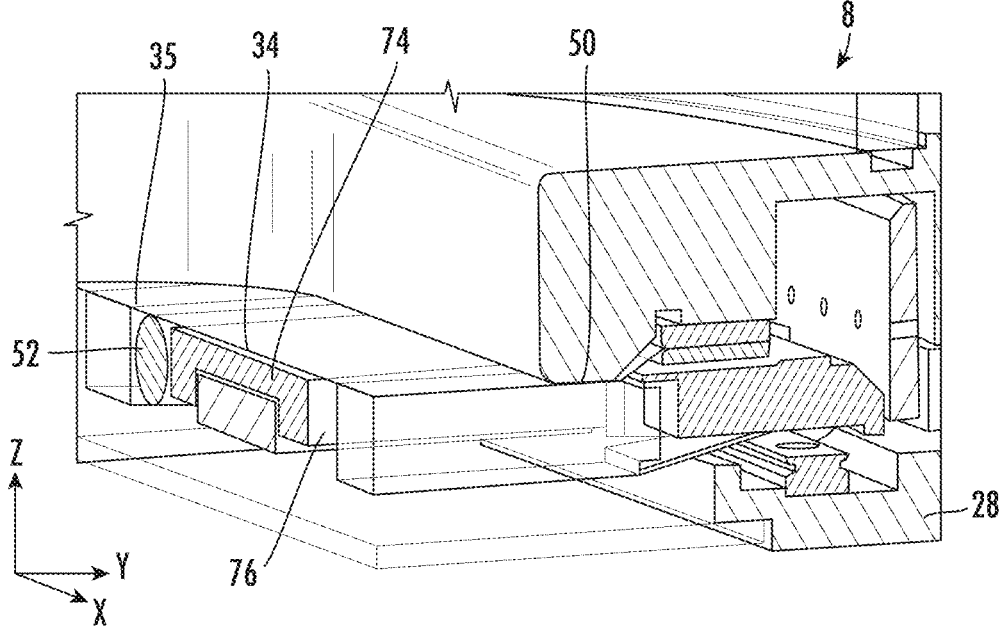
FIG. 16 is an isometric detail view of a portion of a build vessel including both roller and air support for a transparent sheet.

FIG. 16 is an isometric view of a portion of the build vessel 8. The supported portion 35 of the transparent sheet 34 is supported by roller 52. Additionally, a glass plate 74 is under the transparent sheet 34 for additional support and spans build plane 56. Like roller 52, the glass plate 74 also presses against the tension ring 50 (with transparent sheet 34 therebetween) as a vertical reference. Finally, a conduit 76 is configured to allow pressurized gas to contact a lower side of the transparent sheet 34. The gas pressure is applied to counteract the weight of the photocurable liquid 10 fluid column above the transparent sheet 34.

A source 72 of the pressurized gas 72 can be a gas canister coupled to a pressure regulator. Alternatively, the source of the pressurized gas 72 can be a gas pump such as a regenerative fan or bellows to name some examples. Fluid or gas pressure sources and pressure regulators are known in the art for 2D and 3D printing and for other industries and are used to maintain and regulate pressures of gas and fluid chambers.

Except for the use of two rollers 52 rather than one roller 52, much or all of the description presented supra with respect to FIGS. 1-12 can apply to the second embodiment described for FIGS. 13-15. Some of the earlier details from the first embodiment need not be repeated. Hence any or all variations described can be utilized with the first and second embodiments of the build vessel 8.

Figures 17, 18:
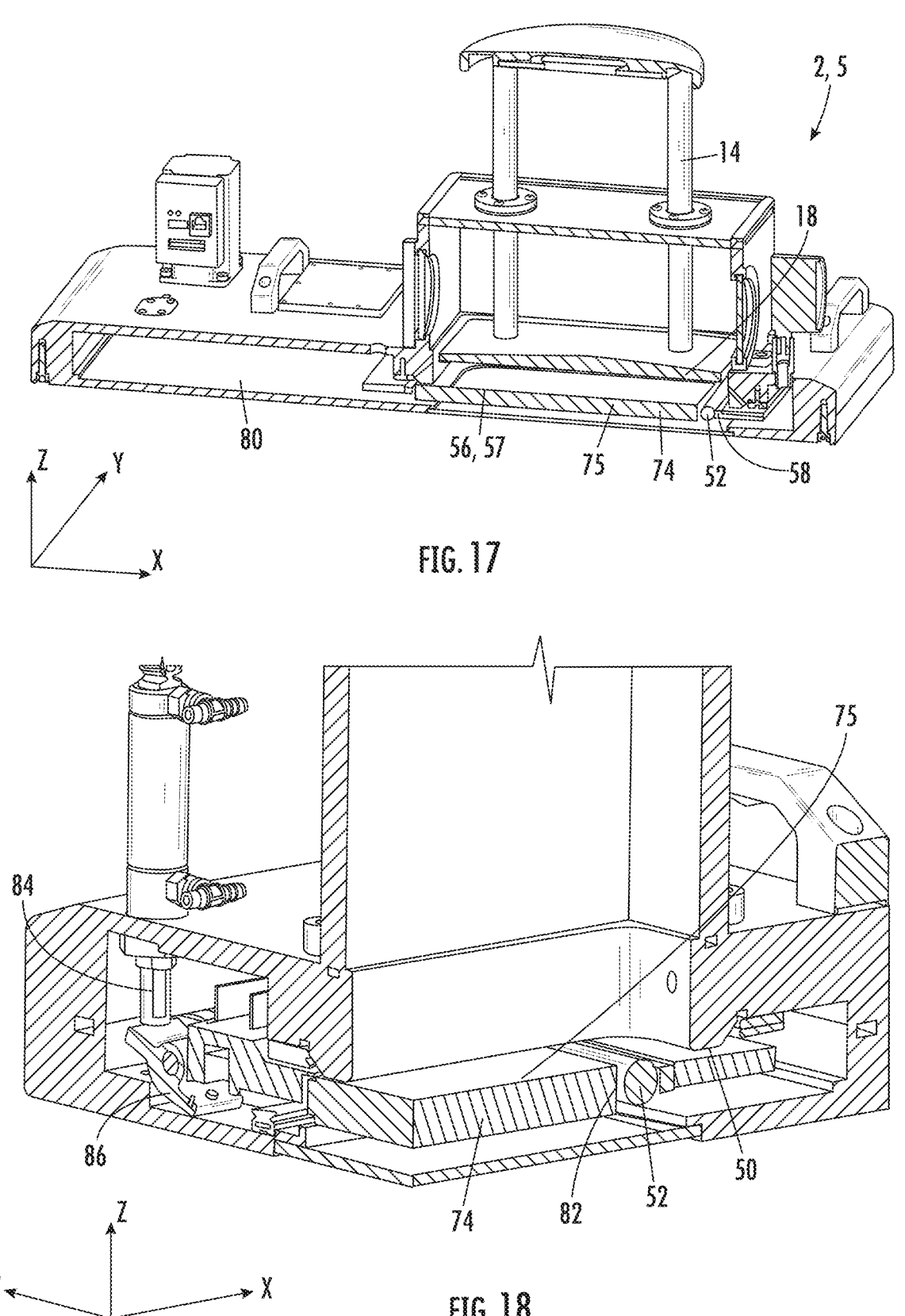
FIG. 17 is an isometric cutaway view of an embodiment of a 3D printing system.
FIG. 18 is a detail cutaway isometric view take from a portion of the apparatus of FIG. 17.

FIG. 17 is an isometric cutaway view of a portion of a variant of the systems described with respect to earlier figures. Like element numbers indicate like functional elements relative to earlier figures except for specific description infra. The embodiment of FIG. 17 can be utilized with most elements of earlier figures, so the former elements are not here illustrated to avoid redundancy. As in earlier embodiments, a carriage 58 supports a roller 52 and a glass plate 74. In the illustrated embodiment, the build plane 56 defines a build area 57. The glass plate 74 has an upper surface 75 with a lateral area that can span the build area 57 (when positioned under the build plane 56).

The chassis 5 defines a recessed volume or cavity 80 that is laterally adjacent to the build area 57. The recessed volume 80 and build area 57 are arranged along the lateral X-axis. The X-motor of the lateral movement mechanism 25 (FIG. 19) is configured to position and translate the carriage 58 (and thus the roller 52 and glass plate 74) along the X-axis. The glass plate 74 can thus be translated from a position within the recessed volume 80 to a position partially or completely spanning the build area 57.

In the embodiment of FIGS. 17-22, the lateral movement mechanism 24 translates the light engine 22 along the X and Y axes independently of the carriage 58. Therefore, a separate X-motor 25 is provided for translating the carriage 58, the roller 52, and glass plate 74 along the X-axis independently of the light engine 22. The particular movement mechanisms 25 and 25 employed operate similarly to those discussed supra and so details are not discussed here.

FIG. 18 is a detail cutaway isometric view taken from a portion of the apparatus of FIG. 17. The glass plate 74 has a lead or leading edge 82 relative to a direction of motion in the +X direction as the glass plate 74 is moved by the X-motor 25 from the recessed volume 80 toward the build area 57. The roller 52 is adjacent to and ahead of the lead edge 82. As discussed supra, the roller 52 is urged or biased against the tension ring 50 by the carriage 58—typically by a leaf spring.

An actuator 84 that engages a lever 86 is configured to vertically raise and lower the glass plate 74 between two vertical positions. The two positions include an (U) upper position and (L) a lower position. In the upper (U) position, the upper surface 75 of the glass plate 74 is pressed up against the tension ring 50. In the lower position (L), the glass plate 74 upper surface 75 is spaced away from the tension ring 50. In the upper position (U), the upper surface 75 supports the transparent sheet 34 when the light engine 22 is selectively irradiating the build plane 56. The lower position (L) facilitates air reaching the transparent sheet 34 and a more rapid transport of the glass plate 74 along the X-axis. In the illustrated embodiment, actuator 84 is a pneumatic actuator 84 that is under control of controller 26 (see FIG. 11). Other actuators 84 can be used such as a motorized cam and follower system.

Figure 19:
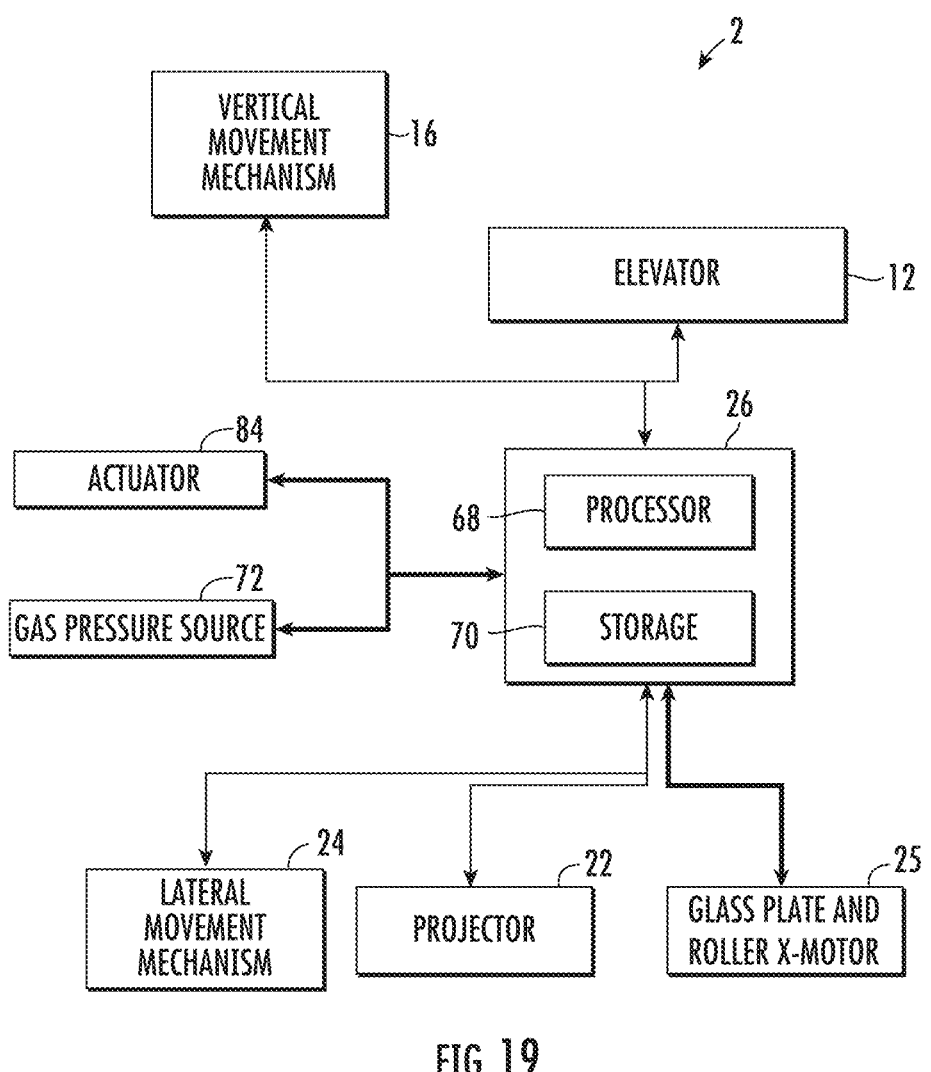
FIG. 19 is a simplified electrical block diagram of a 3D printing system.

FIG. 19 is a simplified electrical block diagram of a second embodiment of 3D printing system 2. The electrical block diagram differs from FIG. 11 in that a second lateral movement mechanism 25 includes an X-motor 25. The lateral movement mechanism 24 moves the light engine 22 along the X and Y axes independently of the carriage 58 (and thus independently of the roller 52 and the glass plate 74). The X-motor 25 moves the carriage 58 and roller and glass plate 74 together but independent of the light engine 22. Otherwise, elements of FIG. 19 are similar to those of FIG. 11.

Figure 20:
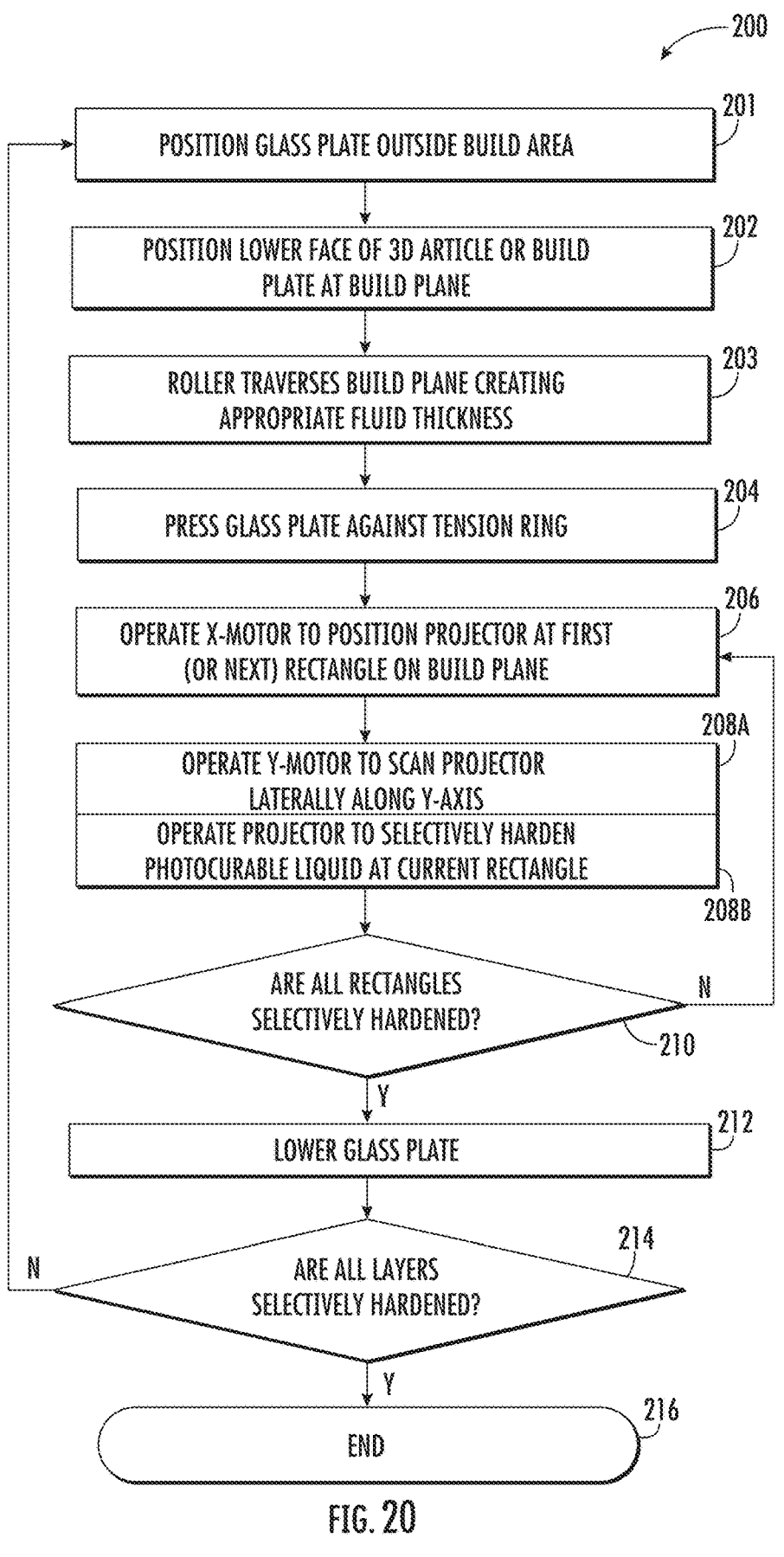
FIG. 20 is a flowchart depicting an embodiment of a method of manufacturing a 3D article.

FIG. 20 is a flowchart depicting an embodiment of a method 200 of manufacturing a three-dimensional (3D) article 4 using the three-dimensional (3D) printing system 2 with emphasis on the embodiment of FIGS. 17-19. As indicated earlier, the embodiment of FIGS. 17-19 also utilizes most features described supra. Method 200 is performed by controller 26 as software instructions stored on non-transient storage devices 70 are executed by processor 68.

According to 201, the glass plate 74 is laterally positioned outside of the build area 57 and inside the recessed volume 80. According to 202, the lower face 20 of the 3D article 4 (or initially the build plate 18) is positioned to be coplanar with the build plane 56. According to 203, the X-motor 25 is operated to cause the roller 52 to traverse the build plane 56 to create an appropriate fluid thickness of the photocurable fluid 10 along the build plane 56. Also as part of step 203, the glass plate 74 is moved from the recessed volume 80 and under the build plane 56. According to 204, the actuator 84 is operated to press the glass plate 74 against the tension ring 50.

According to 206, the X-motor of the lateral movement mechanism 24 is operated to translate the projector 22 to allow it to selectively image a lateral rectangle 88 of the build area 57. According to 208A/B, the projector 22 is operated to selectively irradiate the lateral rectangle 88 of the build plane 56. According to 208A, the Y-motor of lateral movement mechanism 24 is operated to translate and scan the projector along the Y-axis. Concurrently according to 208B, the projector 22 is operated to selectively irradiate the lateral rectangle 88 while scanning. Alternatively, 208A/B can occur in a "step and repeat" manner alternating between moving and irradiating a rectangle or square area at a time that is a portion of the rectangle 88. In a further alternative embodiment, no stepping or scanning occurs if the light engine 22 is capable of selectively irradiating the entire lateral rectangle 88 without scanning or stepping.

According to 210, a determination is made as to whether all rectangles 88 of the build plane 56 have been selectively irradiated. If not, then the process loops back to step 206 where the movement mechanism 24 moves the projector 22 to the next rectangle and where step 208A/B repeats. However, once all rectangles 88 have been irradiated, then the process moves to step 212 at which time the actuator 84 is operated to lower the glass plate 74 away from the tension ring 50.

According to 214, a determination is made as to whether all layers of the 3D article 4 have been formed. If so, the method ends at 216. Otherwise, the process loops back to step 201.

Figures 21, 22:
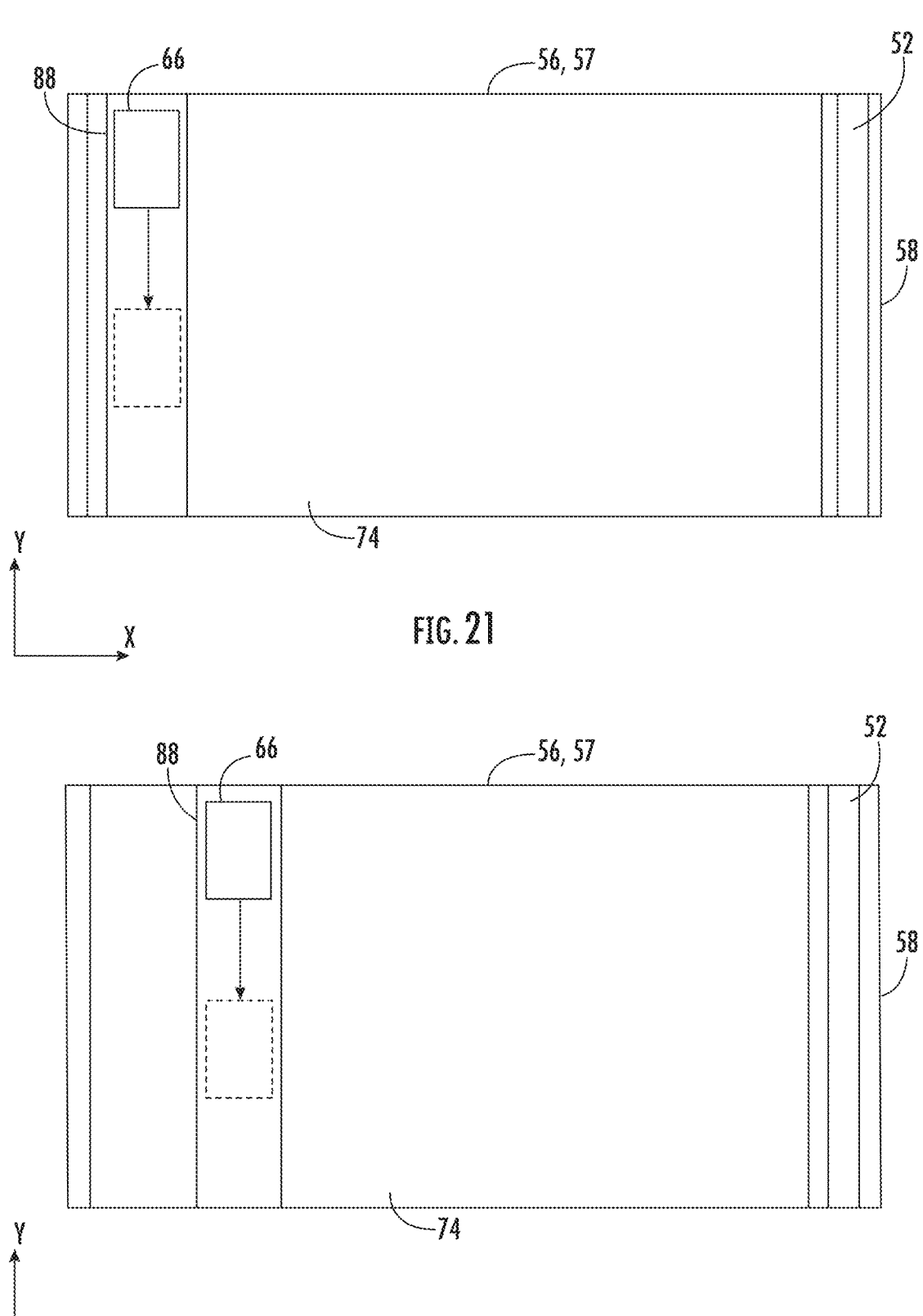
FIG. 21 is a schematic diagram to illustrate a first step of selectively irradiating a portion of a build plane.
FIG. 22 is a schematic diagram to illustrate a second step of selectively irradiating a portion of a build plane.

FIGS. 21 and 22 schematically illustrate repetition of steps 206-208 during selective hardening of a layer of the photocurable liquid 10. Elements 56 and 57 represent the build plane 56 and build area 57, respectively. In FIG. 20, the X-motor of movement mechanism 24 has advanced the projector 22 to allow selective irradiation of a lateral rectangle or rectangular area 88 of the build plane 56. Element 66 represents a pixelated rectangular pattern of radiation 66 that is scanned or stepped across the lateral rectangle 88. FIG. 22 represents looping back to step 206 and selective irradiation of the next lateral rectangle 88.

The specific embodiments and applications thereof described above are for illustrative purposes only and do not preclude modifications and variations encompassed by the scope of the following claims.

For example, another embodiment can be envisioned. The two roller 52 support of FIGS. 5-8 can be utilized with the gas pressure 72. The gas pressure 72 will reach the lower side and supported portion 35 of the transparent sheet 34 through small openings within the carriage 58 and between attached components. The gas pressure at least partially offsets a downward pressure of the photocurable resin or bio-ink 10 so as to reduce a force required to support the transparent sheet 34 in the supported region 35 by roller or rollers 52. This improves flatness of supported region 35.

It is to be understood that any combination of elemental limitations described supra in the various embodiments can be used in an embodiment, as long as they are compatible. In particular, the following can be utilized with the embodiment discussed with respect to FIGS. 17-21. The general description described in FIGS. 1 and 2 can apply including all described elements. The build vessel of FIGS. 3 and 4 can apply. The gas pressure source 72 indicated and described with respect to FIGS. 11 and 14 can be used to offset part of the pressure of a fluid column of photocurable liquid 10 that would tend to press down upon the transparent sheet 34.

What is claimed:

1. A three-dimensional (3D) printing system configured to manufacture a 3D article, the 3D printing system comprising:

a machine chassis including a vessel support;

a build vessel containing photocurable fluid and supported by the vessel support, the build vessel including:

a vessel base having a downward extending tension ring; and a transparent sheet that is tensioned over the tension ring and laterally bounds a build plane defined along orthogonal lateral axes including an X-axis and a Y-axis of the 3D printing system, wherein a lower surface of the transparent sheet supported by the tension ring defines a datum plane;

a carriage supporting a glass plate and a roller, wherein the roller extends laterally below two opposing sides of the tension ring, and the carriage is configured to press the roller against the two opposing sides of the tension ring so that an upper crest of the roller is coplanar with the datum plane;

an actuator coupled to the glass plate and configured to vertically position an upper surface of the glass plate in two positions including (U) an upper position at which the upper surface of the glass plate is coplanar with the datum plane and (L) a lower position in which the upper surface of the glass is spaced away from the datum plane;

a build platform supported over a build area of the build plane, the build platform including a build plate having a lower surface for supporting the 3D article over the build area; and a light engine.

2. The three-dimensional (3D) printing system of claim 1 further including a controller programmed to perform the following steps:

(1) position a lower face of the 3D article in a partially fabricated state to be coplanar with the build plane;

(2) translate the glass plate along the X-axis to overlap a rectangular area under the build area;

(3) operate the actuator to vertically position the upper surface of the glass plate to the (U) upper position;

(4) position and operate the light engine to selectively irradiate the rectangular area and to selectively harden a layer of the photocurable fluid onto the lower face of the partially fabricated 3D article over a positional area of the build plane; and (5) operate the actuator to lower the upper surface of the glass plate to the (L) lower position.

3. The three-dimensional (3D) printing system of claim 2 wherein the controller is further programmed such that during step (2), the roller traverses the build area to provide a correct fluid thickness of the photocurable fluid upon the transparent sheet.

4. The three-dimensional (3D) printing system of claim 2 wherein the controller is further programmed to repeat step (4) for a sequence of rectangular areas along the X-axis until the build plane has been selectively irradiated to form a new layer of hardened photocurable fluid onto the lower face of the 3D article before performing step (5).

5. The three-dimensional (3D) printing system of claim 2 wherein the controller is further programmed such that during step (4), the light engine is transported along the X-axis independently of an X-axis position of the glass plate.

6. The three-dimensional (3D) printing system of claim 2 wherein the controller is further programmed such that during step (4), the light engine is scanned or stepped along the Y-axis to enable the selective irradiation of the rectangular area.

7. The three-dimensional (3D) printing system of claim 2 wherein the machine chassis defines a recessed volume that is laterally adjacent to the build area, and wherein the controller is further programmed such that during step (2), the glass plate is transported from the recessed volume to overlap with the positional area.

8. The three-dimensional (3D) printing system of claim 2 wherein the controller is further programmed such that the roller translates at a lead edge of the glass plate during step (2).

9. The three-dimensional (3D) printing system of claim 2 wherein the controller is further programmed such that a gas pressure is applied under the transparent sheet to at least partially offset a fluid column force of the photocurable fluid above the transparent sheet.

10. The three-dimensional (3D) printing system of claim 1 wherein the glass plate has a lateral dimension along the X-axis at least equal to a lateral dimension of the build plane along the X.

11. The three-dimensional (3D) printing system of claim 1 wherein the glass plate is one of a plurality of glass plates supported by the carriage and arranged along the X-axis.

12. A three-dimensional (3D) printing system configured to manufacture a 3D article, the 3D printing system comprising:

a machine chassis including a vessel support;

a build vessel containing photocurable fluid and supported by the vessel support, the build vessel including:

a vessel base having a downward extending tension ring; and a transparent sheet that is tensioned over the tension ring and laterally bounds a build plane defined along orthogonal lateral axes including an X-axis and a Y-axis of the 3D printing system, wherein a lower surface of the transparent sheet supported by the tension ring defines a datum plane;

a carriage supporting a glass plate and a roller along a leading edge of the glass plate, wherein the roller extends laterally below two opposing sides of the tension ring, and the carriage is configured to press the roller against the two opposing sides of the tension ring so that an upper crest of the roller is pressed against the datum plane;

an actuator coupled to the glass plate and configured to vertically position an upper surface of the glass plate in two positions including (U) an upper position at which the upper surface of the glass plate is coplanar with the datum plane and (L) a lower position in which the upper surface of the glass is spaced away from the datum plane;

a build platform supported over a build area of the build plane, the build platform including a build plate having a lower surface for supporting the 3D article over the build area; and a light engine;

the machine chassis having a non-build area laterally adjacent to the build area.

13. The three-dimensional (3D) printing system of claim 12 further comprising a controller, wherein the controller is programmed to:

position a lower face of the 3D article in a partially fabricated state to be coplanar with the build plane;

operate the actuator to position the upper surface of the glass plate to the (U) upper position;

translate the leading edge of the glass plate from the non-build area along the X-axis until the glass plate overlaps with the build area; and position and operate the light engine to selectively irradiate an area of the build plane above the glass plate.

14. The three-dimensional (3D) printing system of claim 13 wherein the controller is further programmed such that during the positioning of the upper surface of the glass plate, the roller traverses the build area.

15. The three-dimensional (3D) printing system of claim 14 wherein the controller is further programmed to:

operate the actuator to lower the upper surface of the glass plate to the (L) lower position; and translate the glass plate along the X-axis until the glass plate is contained within the non-build area.

16. The three-dimensional (3D) printing system of claim 13 wherein the controller is further programmed such that during the positioning and operating of the light engine, a rectangular portion of the build plane is selectively irradiated thereby, the controller further programmed to progressively and selectively irradiate a sequence of rectangular portions of the build plane.

17. The three-dimensional (3D) printing system of claim 13 wherein the controller is further programmed to:

operate the actuator to lower the upper surface of the glass plate to the (L) lower position; and translate the glass plate along the X-axis until the glass plate is contained within the non-build area.

18. The three-dimensional (3D) printing system of claim 13 wherein the controller is further programmed such that during the positioning of the light engine, the light engine is positioned independently along the X-axis relative to the glass plate.

19. The three-dimensional (3D) printing system of claim 18 wherein the controller is further programmed such that during the positioning and operating of the light engine, the light engine is scanned or stepped along the Y-axis to selectively irradiate one rectangular portion of the build plane.

20. The three-dimensional (3D) printing system of claim 13 wherein the controller is further programmed such that during the positioning and operating of the light engine, the light engine is scanned or stepped along the Y-axis to selectively irradiate one rectangular portion of the build plane.

* * * * *